(12) United States Patent
Liu et al.

(10) Patent No.: US 12,225,266 B2
(45) Date of Patent: Feb. 11, 2025

(54) LIVESTREAMING METHOD, APPARATUS AND DEVICE, STORAGE MEDIUM, AND COMPUTER PROGRAM PRODUCT

(71) Applicant: Beijing Bytedance Network Technology Co., Ltd., Beijing (CN)

(72) Inventors: Wenjing Liu, Beijing (CN); Mengying Fang, Beijing (CN); Guizhang Chen, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/544,937

(22) Filed: Dec. 19, 2023

(65) Prior Publication Data
US 2024/0137616 A1 Apr. 25, 2024
US 2024/0236422 A9 Jul. 11, 2024

Related U.S. Application Data

(63) Continuation of application No. PCT/CN2022/104052, filed on Jul. 6, 2022.

(30) Foreign Application Priority Data

Jul. 12, 2021 (CN) .......................... 202110786194.2

(51) Int. Cl.
*H04N 21/454* (2011.01)
*H04L 65/61* (2022.01)
(Continued)

(52) U.S. Cl.
CPC ......... *H04N 21/4542* (2013.01); *H04L 65/61* (2022.05); *H04N 21/2187* (2013.01); *H04N 21/472* (2013.01); *H04N 21/4758* (2013.01)

(58) Field of Classification Search
CPC ........... H04N 21/4542; H04N 21/2187; H04N 21/472; H04N 21/4758; H04L 65/61
See application file for complete search history.

(56) References Cited

U.S. PATENT DOCUMENTS 7,818,763 B2 10/2010 Sie et al.
2008/0244671 A1 10/2008 Moon et al.
(Continued)

FOREIGN PATENT DOCUMENTS

CN 106162240 A 11/2016
CN 305928203 S 7/2020
(Continued)

OTHER PUBLICATIONS

"How to watch Enter the Fat Dragon movie full version on your phone," Baidu Experience, Available Online at https://jingyan.baidu.com/article/c33e3f4847f671ab14cbb549.html, Feb. 18, 2020, 16 pages.
(Continued)

*Primary Examiner* — Alazar Tilahun
(74) *Attorney, Agent, or Firm* — Alleman Hall & Tuttle LLP

(57) ABSTRACT

A livestreaming method, apparatus and device, a storage medium, and a computer program product. The method includes: displaying a target object introduction page in response to triggering of the first permission control corresponding to a target object, during playing of a live video in a preview stage or after an end of the playing of the live video in the preview stage; displaying a permission operation interface in response to triggering of the second permission control; returning to a live video interface and playing the live video, in response to completing of an operation of at least one operation item of the permission operation interface. The target object introduction page includes the second permission control. A live video stream
(Continued)

is blurred or stopped from being pushed after the end of the playing of the live video in the preview stage. The permission operation interface includes at least one operation item.

19 Claims, 13 Drawing Sheets

(51) Int. Cl.
  *H04N 21/2187* (2011.01)
  *H04N 21/472* (2011.01)
  *H04N 21/475* (2011.01)

(56) References Cited

U.S. PATENT DOCUMENTS

| | | | |
|---|---|---|---|
| 2013/0117692 A1* | 5/2013 | Padmanabhan | G06V 40/172 715/753 |
| 2018/0192154 A1* | 7/2018 | Paul | H04N 21/234336 |
| 2019/0261039 A1 | 8/2019 | Woschank et al. | |
| 2019/0306540 A1 | 10/2019 | Holmberg et al. | |
| 2021/0409825 A1* | 12/2021 | Meyer | H04N 21/26208 |

FOREIGN PATENT DOCUMENTS

| | | |
|---|---|---|
| CN | 111918076 A | 11/2020 |
| EP | 0962096 A1 | 8/1998 |

OTHER PUBLICATIONS

"How to watch the full version of Enter the Fat Dragon," Baidu Experience, Available Online at https://jingyan.baidu.com/article/f7ff0bcf494f616f26bb13f3.htm, Feb. 2, 2020, 18 pages.

"How to Watch Enter the Fat Dragon Online," Baidu Experience, Available Online at https://jingyan.baidu.com/article/b87fe19ed473d51318356896.html, Feb. 2, 2020, 14 pages.

"Donnie Yen's new movie Enter the Fat Dragon online full version," Baidu Experience, Available Online at https://jingyan.baidu.com/article/295430f11155c54d7e0050c7.html, Feb. 1, 2020, 14 pages.

European Patent Office, Extended European Search Report Issued in Application No. 22841238.3, Oct. 29, 2024, 7 pages.

European Patent Office, Communication pursuant to Rules 70(2) and 70a(2) EPC for European Application No. 22841238.3, mailed Nov. 15, 2024, 1 page.

* cited by examiner

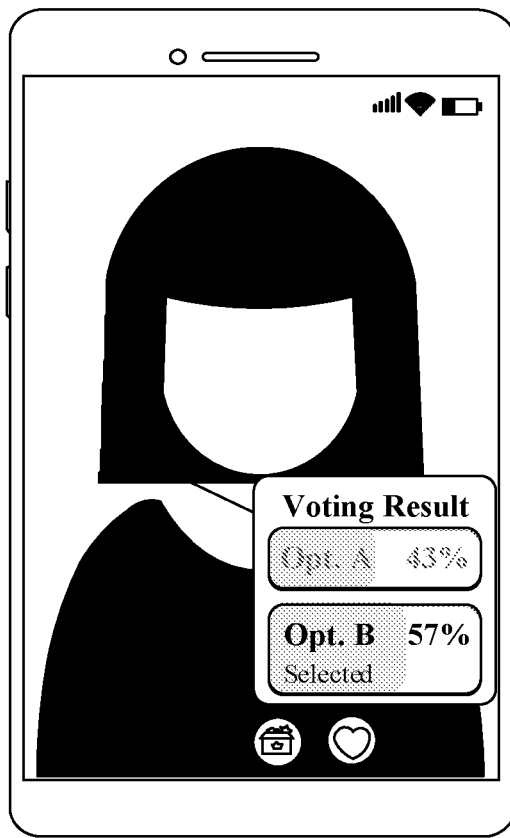

FIG. 21

```
Display a target object introduction page in response to
triggering of a first permission control corresponding to a
target object, during playing of a live video in a preview   ─── S101
stage or after the end of playing of a live video in a preview
                          stage
                            ↓
Display a permission operation interface in response to      ─── S103
        triggering of the second permission control
                            ↓
Return to a live video interface and play the live video, in
response to completing of operation of at least one operation ─── S105
     item of the permission operation interface
                            ↓
Display the live video interface in landscape and full screen ─── S107"
     in response to triggering of the full-screen control
```

FIG. 22

LIVESTREAMING METHOD, APPARATUS AND DEVICE, STORAGE MEDIUM, AND COMPUTER PROGRAM PRODUCT

CROSS-REFERENCE TO RELATED APPLICATION

This application is a continuation of International Patent Application No. PCT/CN2022/104052, filed on Jul. 6, 2022, which claims the priority to and benefits of Chinese Patent Application No. 202110786194.2, filed on Jul. 12, 2021. All the aforementioned patent applications are hereby incorporated by reference in their entireties.

TECHNICAL FIELD

The present disclosure relates to the technical field of computer communication, in particular to a livestreaming method, apparatus, device, storage medium and computer program product.

BACKGROUND

With the Internet gradually becoming the primary carrier for the information society, especially with the emerging of network livestreaming, the contents, such as personal exhibitions, product exhibitions, dialogues and interviews, are released onto the Internet in real time through players, web browsers, etc., which improves, with the characteristics such as intuition and interactivity of the Internet, the exhibition's promoting effects such as live video and graphic broadcasts.

SUMMARY

In order to solve or at least partially solve the above technical problem, the present disclosure provides a livestreaming method, apparatus, device, storage medium and computer program product.

A first aspect of the present disclosure provides a livestreaming method, which includes:
displaying a target object introduction page which includes the second permission control, in response to triggering of the first permission control corresponding to a target object, during playing of a live video in a preview stage or after the end of playing of a live video in a preview stage;
displaying a permission operation interface in response to triggering of the second permission control, the permission operation interface including at least one operation item;
returning to a live video interface and playing the live video, in response to the completing of operation of at least one operation item of the permission operation interface. The live video stream is blurred or stopped from being pushed after the end of playing of the live video in the preview stage.

In a possible implementation, the displaying a target object introduction page in response to triggering of the first permission control corresponding to a target object, during playing of a live video in a preview stage or after the end of playing of a live video in a preview stage includes:
displaying the target object introduction page in response to triggering of the first permission control corresponding to the target object displayed on the live video interface during playing of the live video in the preview stage in a virtual livestreaming room;
alternatively,
displaying an interactive introduction page in response to triggering of a target interactive button on the live video interface during playing of the live video in the preview stage in a virtual livestreaming room, and displaying the target object introduction page in response to triggering of the first permission control displayed on the interactive introduction page;
alternatively,
blurring the live video stream or stopping pushing the live video stream, and displaying the first permission control corresponding to the target object on the live video interface, after the end of playing of the live video in the preview stage in a virtual livestreaming room, and displaying the target object introduction page in response to triggering of the first permission control.

In a possible implementation, the displaying a target object introduction page in response to triggering of a first permission control corresponding to a target object, after the end of playing of a live video in a preview stage includes:
blurring the live video stream or stopping pushing the live video stream, and popping up a target object conversion card on the live video interface, after the end of playing of the live video in the preview stage in a preview stream, and displaying the target object introduction page in response to triggering of the first permission control displayed on the target object conversion card; or, displaying the target object introduction page in response to triggering of any position of the target object conversion card.

In a possible implementation, before the returning to a live video interface and playing the live video, in response to completing of operation of at least one operation item of the permission operation interface, part or all of the interactive buttons displayed on the live video interface are in a trigger-forbidden state.

In a possible implementation, during the playing of the live video in the preview stage in the preview stream, the live video interface displays a permission tag corresponding to the target object. The permission tag is used to indicate that permission operation is required to watch the complete live video.

In a possible implementation, after the returning to a live video interface and playing the live video, in response to completing of operation of at least one operation item of the permission operation interface, the method further includes:
displaying an interactive detail page on which virtual props corresponding to interactive data are displayed, in response to triggering of the target interactive button of the live video interface.

In a possible implementation, after the returning to a live video interface and playing the live video, in response to completing of operation of at least one operation item of the permission operation interface, the method further includes:
displaying a voting result in response to triggering of an option of a voting window displayed on the live video interface.

In a possible implementation, in a case that the live video stream is a landscape video stream, the live video interface further displays a full-screen control.

The method further includes:
displaying the live video interface in landscape and full screen in response to triggering of the full-screen control.

A second aspect of the present disclosure provides a livestreaming apparatus, which includes the first display module and the second display module.

The first display module is configured to: display a target object introduction page including a second permission control in response to triggering of a first permission control corresponding to a target object, during playing of a live video in a preview stage or after the end of playing of a live video in a preview stage; and display a permission operation interface in response to triggering of the second permission control. A live video stream is blurred or stopped from being pushed after the end of playing of the live video in the preview stage. The permission operation interface includes at least one operation item.

The second display module is configured to return to a live video interface and play the live video, in response to completing of operation of at least one operation item of the permission operation interface.

In a possible implementation, the first display module is further configured to display the target object introduction page in response to triggering of the first permission control corresponding to the target object displayed on the live video interface during playing of the live video in the preview stage in a virtual livestreaming room;

or, further configured to: display an interactive introduction page in response to triggering of a target interactive button on the live video interface during playing of the live video in the preview stage in a virtual livestreaming room, and display the target object introduction page in response to triggering of the first permission control displayed on the interactive introduction page;

or, further configured to: blur the live video stream or stop pushing the live video stream, and display the first permission control corresponding to the target object on the live video interface, after the end of playing of the live video in the preview stage in a virtual livestreaming room, and display the target object introduction page in response to triggering of the first permission control.

In a possible implementation, the first display module is further configured to: blur the live video stream or stop pushing the live video stream, and pop up a target object conversion card on the live video interface, after the end of playing of the live video in the preview stage in a preview stream, and display the target object introduction page in response to triggering of the first permission control displayed on the target object conversion card; or, display the target object introduction page in response to triggering of any position of the target object conversion card.

In a possible implementation, before the returning to a live video interface and playing the live video, in response to completing of operation of at least one operation item of the permission operation interface, part or all of the interactive buttons displayed on the live video interface are in a trigger-forbidden state.

In a possible implementation, during the playing of the live video in the preview stage in the preview stream, the live video interface displays a permission tag corresponding to the target object. The permission tag is used to indicate that permission operation is required to watch the complete live video.

In a possible implementation, the second display module is further configured to display an interactive detail page on which virtual props corresponding to interactive data are displayed, in response to triggering of the target interactive button of the live video interface.

In a possible implementation, the second display module is further configured to display a voting result in response to triggering of an option of a voting window displayed on the live video interface.

In a possible implementation, when the live video stream is a landscape video stream, the live video interface further displays a full-screen control;

the second display module is further configured to display the live video interface in landscape and full screen in response to triggering of the full-screen control.

A third aspect of the present disclosure provides an electronic device comprising a processor for executing a computer program stored in a memory. The computer program, when executed by the processor, implements the steps of the method described in the first aspect.

A fourth aspect of the present disclosure provides a computer-readable storage medium having stored thereon a computer program which, when executed by a processor, implements the steps of the method described in the first aspect.

A fifth aspect of the present disclosure provides a computer program product which, when executed on a computer, causes the computer to perform the method described in the first aspect.

BRIEF DESCRIPTION OF DRAWINGS

The accompanying drawings herein, which are incorporated in the specification and constitute a part thereof, illustrate embodiments conforming to the present disclosure and together with the description, serve to explain the principles of the present disclosure.

In order to illustrate the technical schemes in the embodiments of the present disclosure or the prior art more clearly, the drawings needed in the description of the embodiments or the prior art will be briefly introduced below. Apparently, it is possible for those ordinary skilled in the art to obtain further drawings according to the accompanying drawings without paying creative labor.

FIG. 21 is a diagram of yet another live video interface provided by the present disclosure;

FIG. 22 is a flowchart of yet another livestreaming method provided by the present disclosure;

DETAILED DESCRIPTION

In order to understand the above objectives, features and advantages of the present disclosure more clearly, the schemes of the present disclosure will be further described below. It should be noted that the embodiments of the present disclosure and the features in the embodiments can be combined with each other without conflict.

In the following description, many specific details are set forth in order to fully understand the present disclosure, but the present disclosure may be implemented in other ways than those described herein. Apparently, the embodiments in the specification are only part of the embodiments of the present disclosure, not all of the embodiments.

The technical scheme disclosed by the present disclosure may be applied to terminal device, and the terminal device may be a computer, a tablet, a mobile phone or other intelligent electronic device. The terminal device has a display screen which may be a touch screen or a non-touch screen. For a terminal device with a touch screen, the user may implement interactive operation with the terminal device through gestures, fingers or touch control tools (e.g., a stylus). For terminal device with a non-touch screen, interactive operation with the terminal device may be implemented through external device (e.g., mouse or keyboard).

The technical scheme of the present disclosure is applied to a livestreaming scenario, and the users can enter the livestreaming scenario use the following possible implementations, but not limited thereto. One of the implementations is to enter the livestreaming scenario through an APP with livestreaming function installed on terminal device, and the APP may only have livestreaming function or may have other functions at the same time, such as short video sharing function, which is not limited by the present disclosure. Another one of the implementations is to enter the livestreaming scenario through an applet, by scanning QR code, by identifying QR code, or the like. Yet another one of the implementations is to enter the livestreaming scenario through a webpage. The present disclosure does not limit the specific implementation to enter the livestreaming scenario, as long as the user can acquire the user information permitted by the user in entering the livestreaming scenario.

Figure 1:
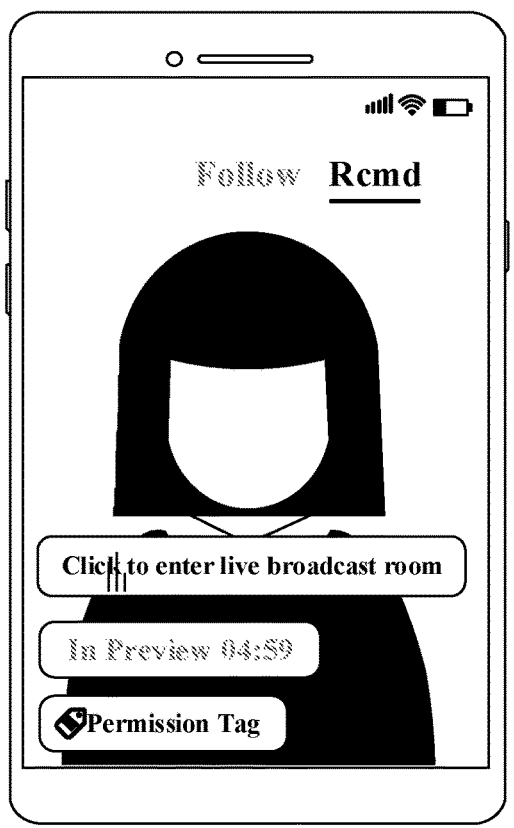
FIG. 1 is a diagram of a live video interface provided by the present disclosure.
Figure 2:
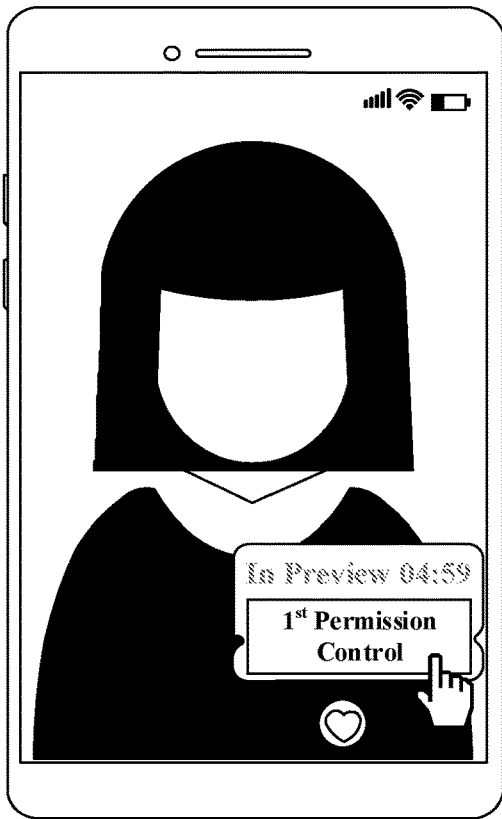
FIG. 2 is a diagram of another live video interface provided by the present disclosure.

The livestreaming scenario of the present disclosure may be a virtual livestreaming room or a preview stream. If the livestreaming scenario is a preview stream, it is possible to enter the virtual livestreaming room through an anchor point of a preview stream display interface. FIG. 1 is a diagram of a live video interface provided by the present disclosure, and FIG. 2 is a diagram of another live video interface provided by the present disclosure. A live video played in the preview stream is shown in FIG. 1. It is possible to consider the entire display area in the preview stream live video interface as the anchor point to enter the virtual livestreaming room, or consider part of the display area in the preview stream live video interface as the anchor point to enter the virtual livestreaming room. The virtual livestreaming room may be entered by clicking on any position in the preview stream live video interface. The live video played in the virtual livestreaming room is shown in FIG. 2.

The played live video in the present disclosure may be a course teaching, a competition or a show, etc. Only some users with viewing permission are allowed to watch the played live video, whereas some users without viewing permission are allowed to take a preview. During the preview or after the end of the preview, non-permitted users may acquire viewing permission.

The target object in the present disclosure may be a permission credential for watching a live video played in a preview stage. The first permission control may be a control for acquiring the permission credential. After the triggering of the first permission control, the target object introduction page is displayed. The target object introduction page displays privileges gained after acquiring the target object, a simple introduction of live content and a second permission control.

The second permission control in the present disclosure is a control for confirming the acquisition of the permission credential. A permission operation interface is displayed upon triggering of the second permission control, and the permission operation interface includes at least one operation item, including an operation item for confirming the acquisition of the permission credential and an operation item for giving up the acquisition of the permission credential. After completing an operation of the operation item for confirming the acquisition of the permission credential, the user may acquire the viewing permission of the live video played in the preview stage, return to the live video interface, continue to play the video stream and watch the complete live video. As such, only the users with acquired viewing permission can watch the complete live video, which implements permission management.

For example, the played live video may be a concert, and the target object is a ticket for watching the concert. The first permission control may be a ticket purchase control, which, upon triggering of the ticket purchase control, displays an introduction of basic information of the concert, privileges of the users with purchased tickets and a control for confirming ticket purchase, and displays, upon the user's triggering of the control for confirming ticket purchase, a resource transferring interface. The user can obtain a concert ticket after completing the resource transferring in the resource transferring interface, and then the user can watch the complete concert. Or, the user can give up the resource transferring in the resource transferring interface to give up obtaining the ticket, in which case the user cannot continue to watch the concert after the end of the preview.

It should be noted that the interface names or control names involved in the present disclosure may serve as examples, or may be replaced by other names implementing the same functions, which is not limited by the present disclosure.

Figure 3:
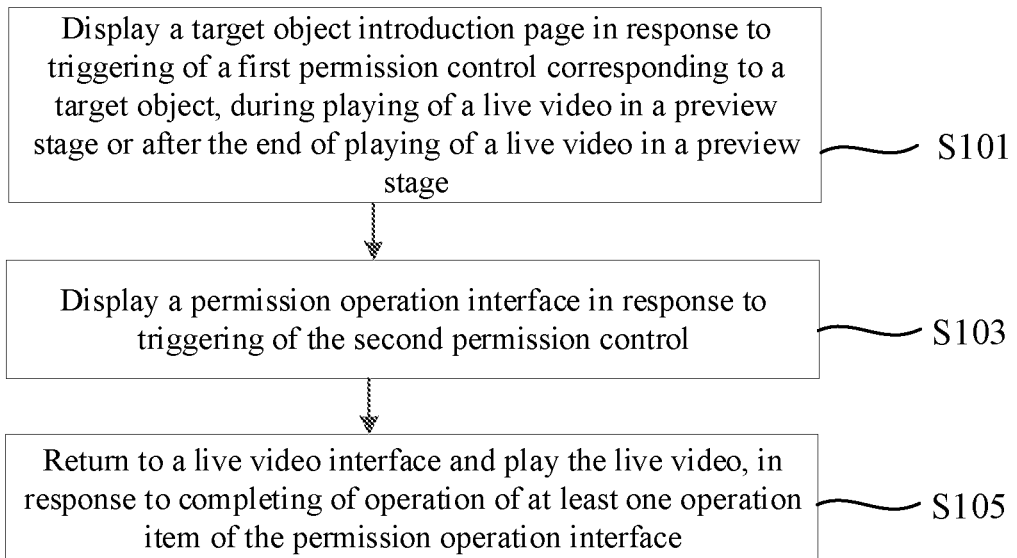
FIG. 3 is a flowchart of a livestreaming method provided by the present disclosure.

The following describes the technical scheme of the present disclosure with several specific embodiments:

FIG. 3 is a flowchart of a livestreaming method provided by the present disclosure, as illustrated in FIG. 3, comprising:

S101: displaying a target object introduction page in response to triggering of the first permission control corresponding to a target object, during the playing of a live video in a preview stage or after the end of the playing of the live video in the preview stage.

The target introduction page includes the second permission control. A live video stream is blurred or stopped from being pushed after the end of playing of the live video in the preview stage.

Figure 4:
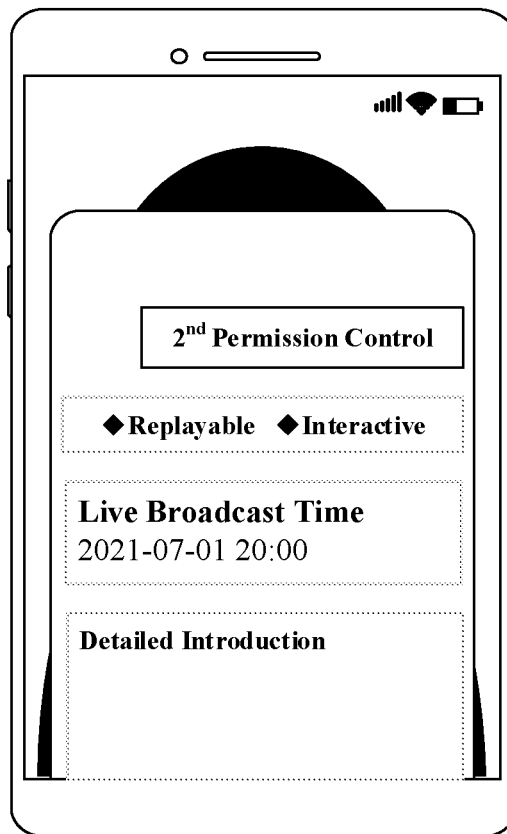
FIG. 4 is a diagram of yet another live video interface provided by the present disclosure.
Figure 5:
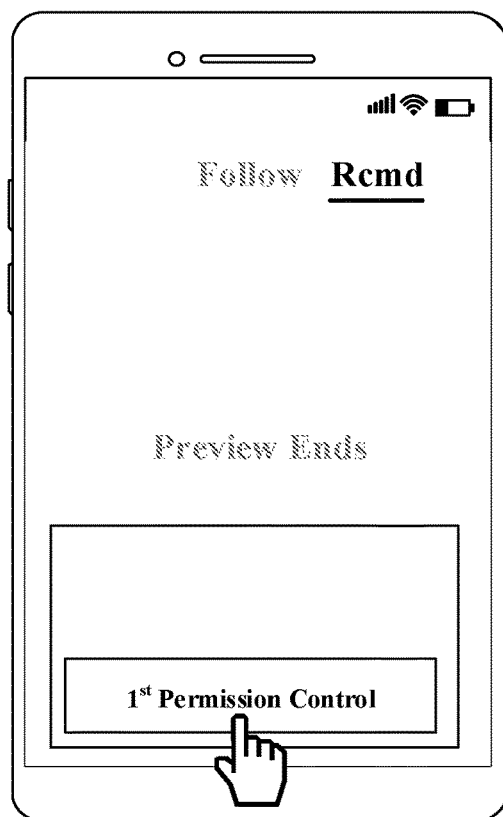
FIG. 5 is a diagram of yet another live video interface provided by the present disclosure.
Figure 6:
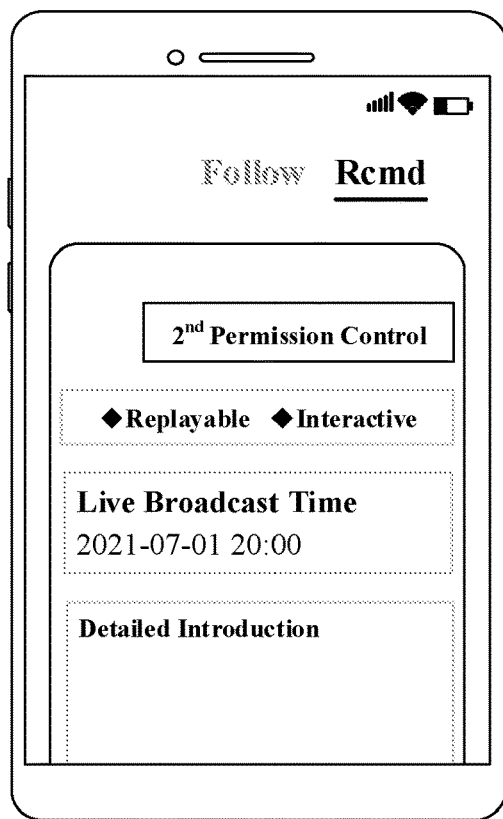
FIG. 6 is a diagram of yet another live video interface provided by the present disclosure.

Exemplarily, FIG. 4 is a diagram of yet another live video interface provided by the present disclosure, FIG. 5 is a diagram of yet another live video interface provided by the present disclosure, and FIG. 6 is a diagram of yet another live video interface provided by the present disclosure. In the case where the live video in the preview stage is played in the virtual livestreaming room, the user may trigger the first permission control displayed on the live video interface during the playing or after the end of the playing, as illustrated in FIG. 2. The target object introduction page is displayed in response to the triggering of the first permission control, as illustrated in FIG. 4. In the case where the live video in the preview stage is played in the preview stream, the user may trigger the first permission control displayed on the live video interface after the end of the playing, as illustrated in FIG. 5. The target object introduction page is displayed in response to the triggering of the first permission control, as illustrated in FIG. 6.

During the playing of the live video in the preview stage in the virtual livestreaming room or in the preview stream, the live video interface displays a preview countdown to remind the user of the time when the preview ends. As illustrated in FIG. 1 and FIG. 2, the preview duration of the present disclosure is a sum of the duration of the live video watched through the virtual livestreaming room and the duration of the live video watched through the preview stream. After the end of playing of the live video in the preview stage in the virtual livestreaming room, the live video stream may be blurred, as illustrated in FIG. 5. For example, the live video stream may be Gaussian blurred, so that the live video interface watched by the user displays the blurred live video, further, the voice of the blurred live video may be muted. Alternatively, the live video stream may be stopped from being pushed, so that the live video is no longer displayed in the live video interface watched by the user. No matter whether the live video stream is blurred or stopped from being pushed, it is impossible to display the live video normally after the preview for the users without the viewing permission.

S103: displaying a permission operation interface in response to the triggering of the second permission control.

The permission operation interface includes at least one operation item.

The permission operation interface includes an operation item for confirming the acquisition of viewing permission and an operation item for giving up the acquisition of viewing permission. In the case where the user completes an operation of the operation item for confirming the acquisition of the viewing permission, he/she may acquire the viewing permission of the live video played in the preview stage. In the case where the user completes an operation of the operation item for giving up the acquisition of the viewing permission, he/she cannot acquire the viewing permission of the live video played in the preview stage. The permission operation interface may be a half screen superimposed on the live video interface, or may cover the live video interface.

S105: returning to a live video interface and playing the live video, in response to the completing of the operation of at least one operation item of the permission operation interface.

By sequentially triggering the first permission control, triggering the second permission control, and completing the operation of the operation item for confirming the acquisition of the viewing permission in the permission operation interface, the user can acquire the viewing permission of the live video played in the preview stage. Returning to the live video interface and playing the live video upon detecting the viewing permission of the user-so that the user with the acquired viewing permission can continue to watch the live video until the end of the live video. That is, the users with the viewing permission can watch the complete live video.

The technical scheme disclosed by the present disclosure may be implemented by: displaying a target object introduction page including the second permission control in response to triggering of the first permission control corresponding to a target object, during playing of a live video in a preview stage or after the end of playing of a live video in a preview stage; displaying a permission operation interface in response to triggering of the second permission control, the permission operation interface including at least one operation item; returning to a live video interface and playing the live video, in response to completing of operation of at least one operation item of the permission operation interface. Alive video stream is blurred or stopped from being pushed after the end of playing of the live video in the preview stage. As such, the user can acquire a permission to watch the live video by sequentially triggering the first permission control, triggering the second permission control, and completing the operation of at least one operation item of the permission operation interface, and the user returns to the live video interface to watch the complete live video after acquiring the viewing permission, which improves the user experience.

Figure 7:
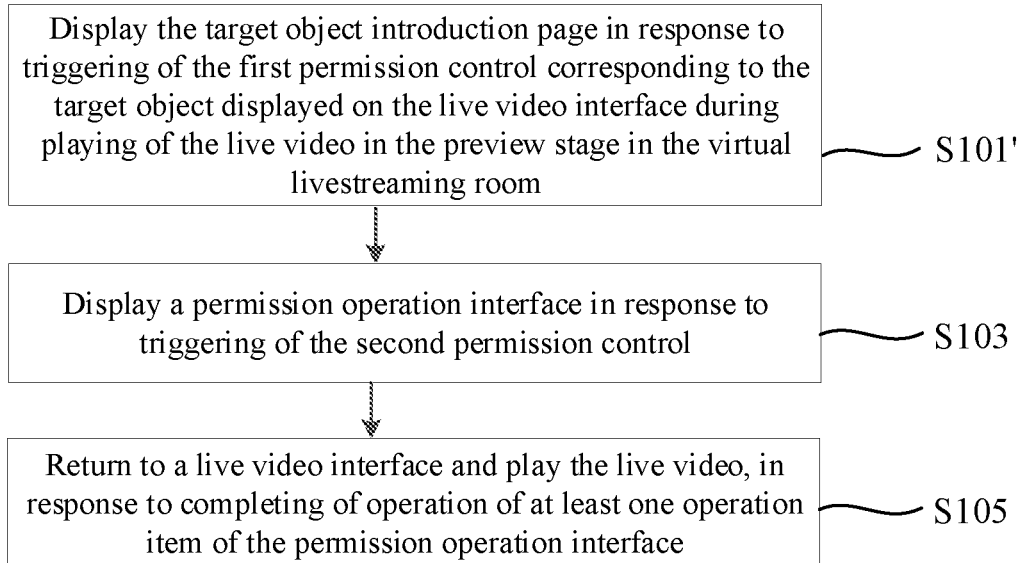
FIG. 7 is a flowchart of another livestreaming method provided by the present disclosure.
Figure 8:
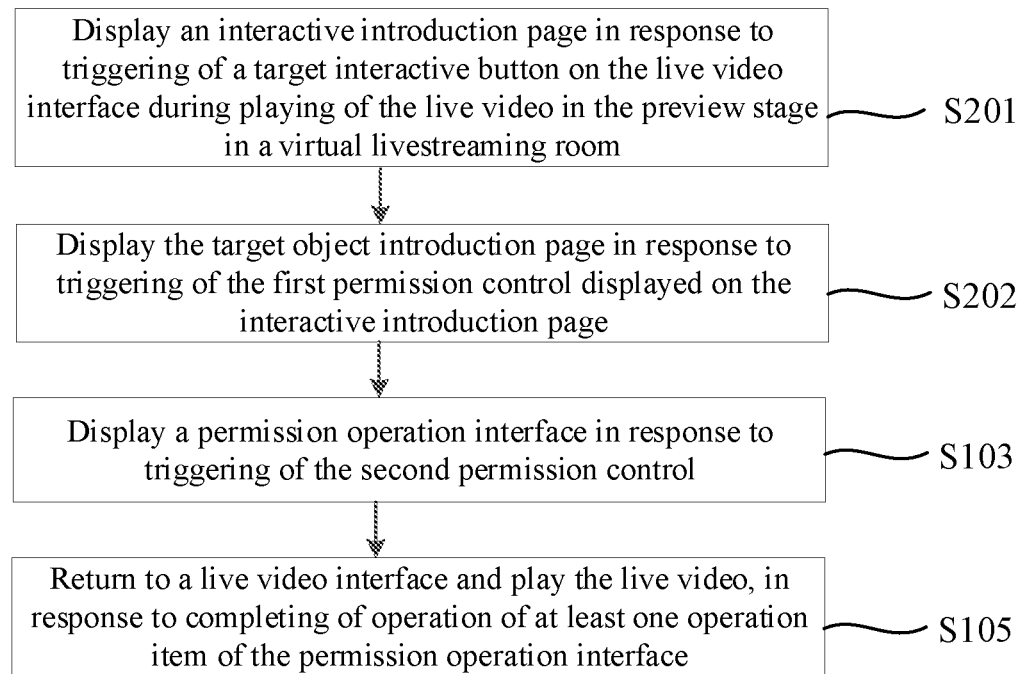
FIG. 8 is a flowchart of yet another livestreaming method provided by the present disclosure.
Figure 9:
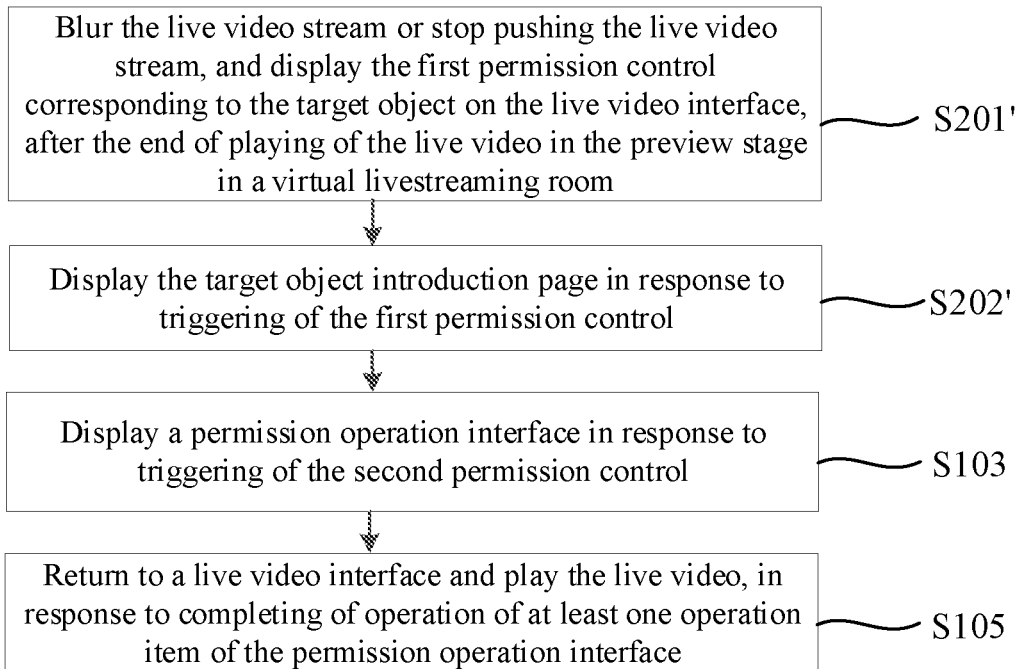
FIG. 9 is a flowchart of yet another livestreaming method provided by the present disclosure.
Figure 10:
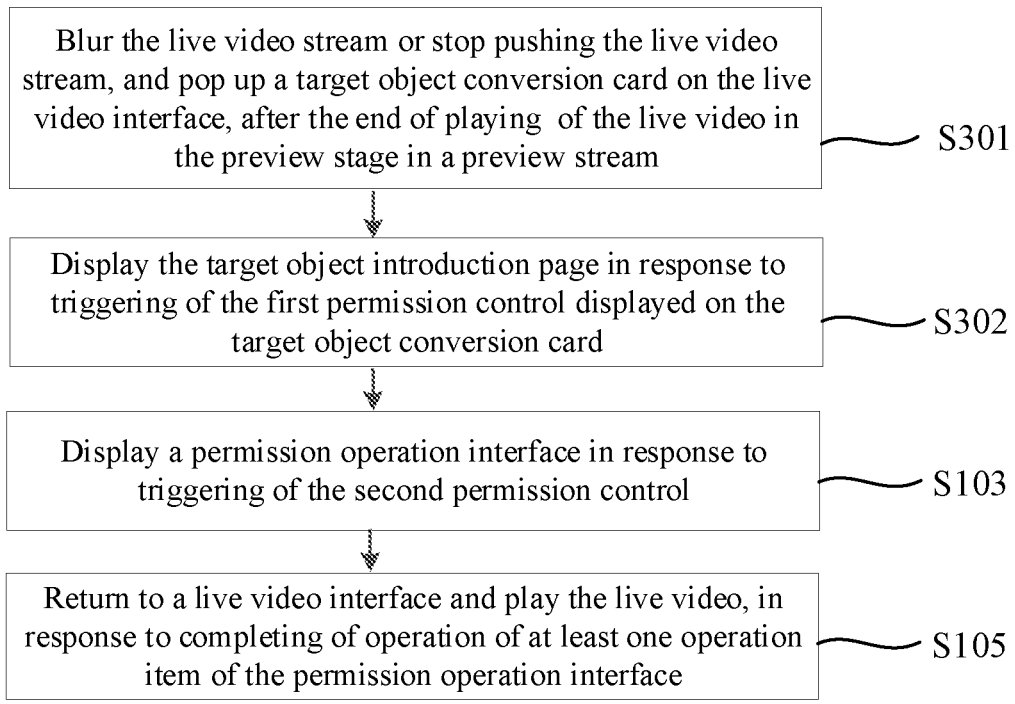
FIG. 10 is a flowchart of yet another livestreaming method provided by the present disclosure.

FIG. 7 is a flowchart of another livestreaming method provided by the present disclosure, FIG. 8 is a flowchart of yet another livestreaming method provided by the present disclosure, FIG. 9 is a flowchart of yet another livestreaming method provided by the present disclosure, and FIG. 10 is a flowchart of yet another livestreaming method provided by the present disclosure. FIGS. 7-10 are all possible implementations of performing S101 on the basis of the embodiment shown in FIG. 3, and the specific details are as follows.

A possible implementation of performing S101, as illustrated in FIG. 7, includes:

S101': displaying the target object introduction page in response to triggering of the first permission control corresponding to the target object displayed on the live video interface during playing of the live video in the preview stage in a virtual livestreaming room.

Exemplarily, during playing of the live video in the preview stage in a virtual livestreaming room, the live video interface displayed is as illustrated in FIG. 2. The user may trigger the first permission control in the live video interface, and in response to the triggering of the first permission control, the target object introduction page as illustrated in FIG. 4 is displayed. The target object introduction page includes information such as a second permission control, a brief introduction of content of live video, the privileges that the user can own after acquiring the viewing permission, etc., as illustrated in FIG. 4.

Another possible implementation of performing S101, as illustrated in FIG. 8, includes:

S201: displaying an interactive introduction page in response to triggering of a target interactive button on the live video interface during playing of the live video in the preview stage in the virtual livestreaming room.

Figure 11:
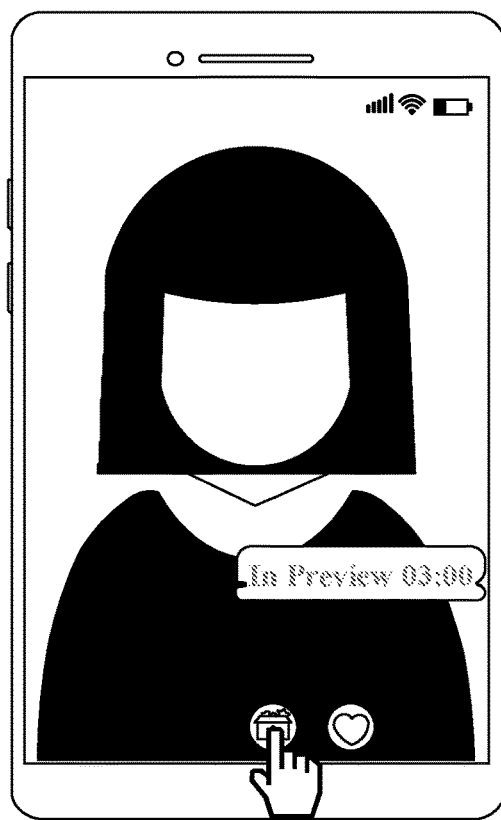
FIG. 11 is a diagram of yet another live video interface provided by the present disclosure.
Figure 12:
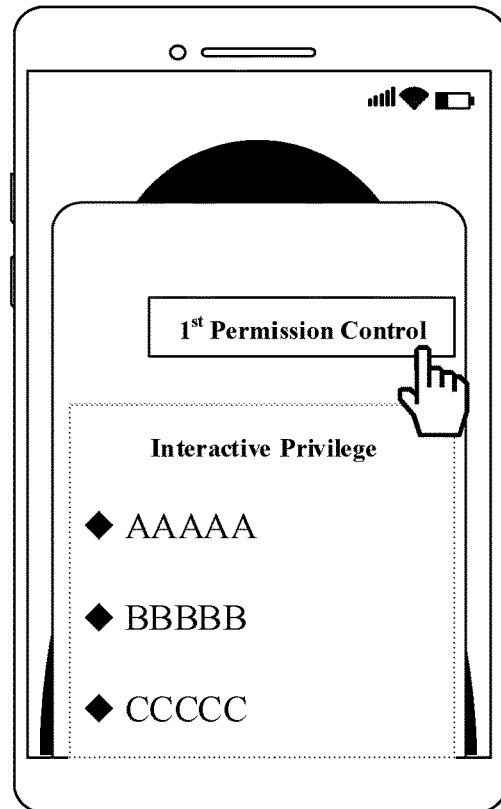
FIG. 12 is a diagram of yet another live video interface provided by the present disclosure.

Exemplarily, FIG. 11 is a diagram of yet another live video interface provided by the present disclosure, and FIG. 12 is a diagram of yet another live video interface provided by the present disclosure. During playing of the live video in the preview stage in the virtual livestreaming room, the user may trigger the target interactive button in the live video interface, as illustrated in FIG. 11. In response to the triggering of the target interactive button, the interactive introduction page as illustrated in FIG. 12 is displayed. The interactive introduction page displays interactive privileges that the user can own after acquiring the viewing permission, so that the user can know rights and benefits information that he/she can acquire after obtaining the viewing permission. In addition, the interactive introduction page further displays the first permission control.

S202: displaying the target object introduction page in response to triggering of the first permission control displayed on the interactive introduction page.

The user may trigger the first permission control in the interactive introduction page, as illustrated in FIG. 12. In response to the triggering of the first permission control, the target object introduction page as illustrated in FIG. 4 is displayed.

Another possible implementation of performing S101, as illustrated in FIG. 9, includes:

S201': blurring the live video stream or stopping pushing the live video stream, and displaying the first permission control corresponding to the target object on the live video interface, after the end of playing of the live video in the preview stage in the virtual livestreaming room.

Figure 13:
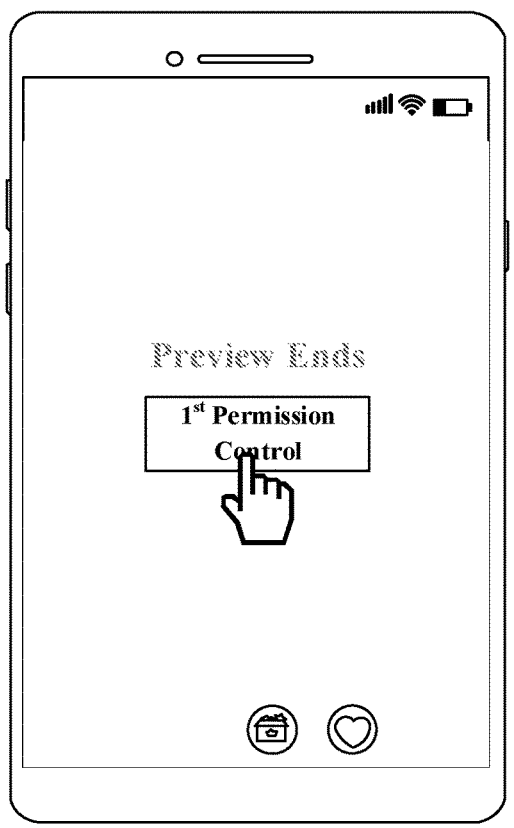
FIG. 13 is a diagram of yet another live video interface provided by the present disclosure.

Exemplarily, FIG. 13 is a diagram of yet another live video interface provided by the present disclosure. After the end of playing of the live video in the preview stage in the virtual livestreaming room, the live video played in the virtual livestreaming room is blurred. As illustrated in FIG. 13, the live video interface of the virtual livestreaming room displays prompt information of "Preview End" and the first permission control. In other implements, it is also possible to stop pushing the live video stream, and the live video will not be displayed in the live video interface of the virtual livestreaming room.

S202': displaying the target object introduction page in response to triggering of the first permission control.

Figure 14:
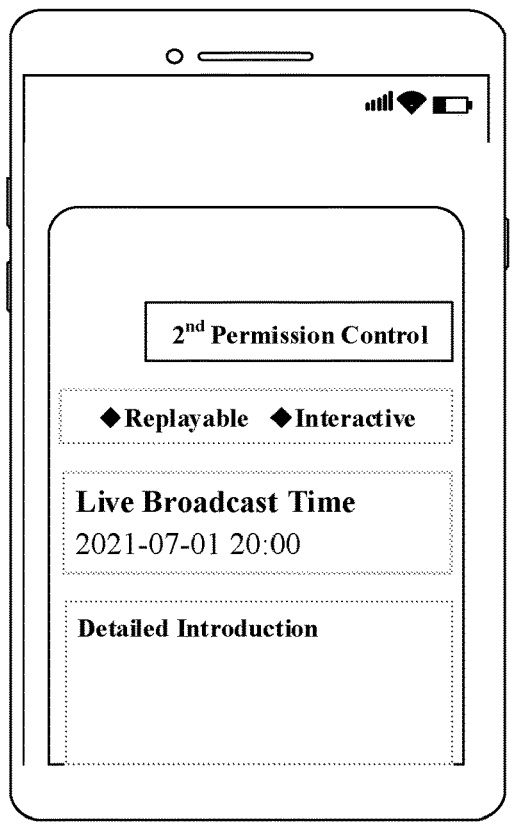
FIG. 14 is a diagram of yet another live video interface provided by the present disclosure.

FIG. 14 is a diagram of yet another live video interface provided by the present disclosure. Exemplarily, the user may trigger the first permission control as illustrated in FIG. 13, and in response to the triggering of the first permission control, the target object introduction page is superimposed and displayed on the blurred live video interface, as illustrated in FIG. 14.

Another possible implementation of performing S101, as illustrated in FIG. 10, includes:

S301: blurring the live video stream or stopping pushing the live video stream, and popping up a target object conversion card on the live video interface, after the end of playing of the live video in the preview stage in a preview stream.

Exemplarily, after the end of playing in a preview stream of the live video in the preview stage, the live video played in the preview stream may be blurred. The preview stream displays the target object conversion card as illustrated in FIG. 5, in which the first permission control is displayed. In other implementations, it is also possible to stop pushing the live video stream, and the live video will not be displayed in the live video interface of the preview stream.

S302: displaying the target object introduction page in response to triggering of the first permission control displayed on the target object conversion card.

Based on the above embodiments, the user may trigger the first permission control as illustrated in FIG. 5, and in response to the triggering of the first permission control, the target object introduction page is superimposed and displayed on the blurred live video interface, as illustrated in FIG. 6.

Based on the above embodiments, before S103 is performed, part or all of the interactive buttons displayed on the live video interface are in a trigger-forbidden state.

Figure 15:
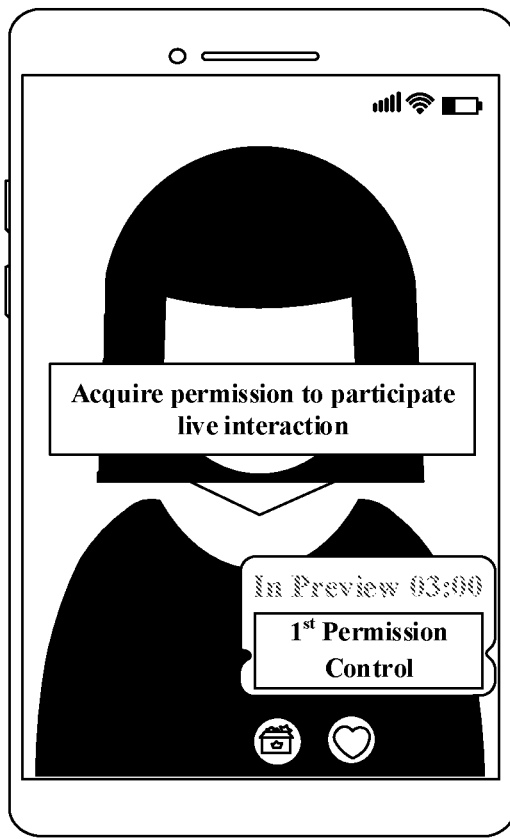
FIG. 15 is a diagram of yet another live video interface provided by the present disclosure.

Exemplarily, FIG. 15 is a diagram of yet another live video interface provided by the present disclosure. Before acquiring of the viewing permission, the user clicks on any interactive button of the live video interface, and then the live video interface displays the picture as illustrated in FIG. 15 so as to prompt the user that the user can interact only after acquiring of the viewing permission, and is currently in a state in which the triggering of the interactive button is prohibited.

In this embodiment, before acquiring the viewing permission, the user cannot trigger part or all of the interactive buttons displayed on the live video interface, and manages the interactive permission on the basis of the viewing permission.

Based on the above embodiments, during the playing of the live video in the preview stage in a preview stream, the live video interface displays a permission tag corresponding to the target object. The permission tag is used to indicate that permission operation is required to watch the complete live video.

Exemplarily, during the playing of the live video in the preview stage in a preview stream, the live video interface displays a permission tag corresponding to the target object. The permission tag may prompt the user that permission operation is required to watch the complete live video, as illustrated in FIG. 1. For example, the permission tag may be paid livestreaming, permitted livestreaming, etc.

Figure 16:
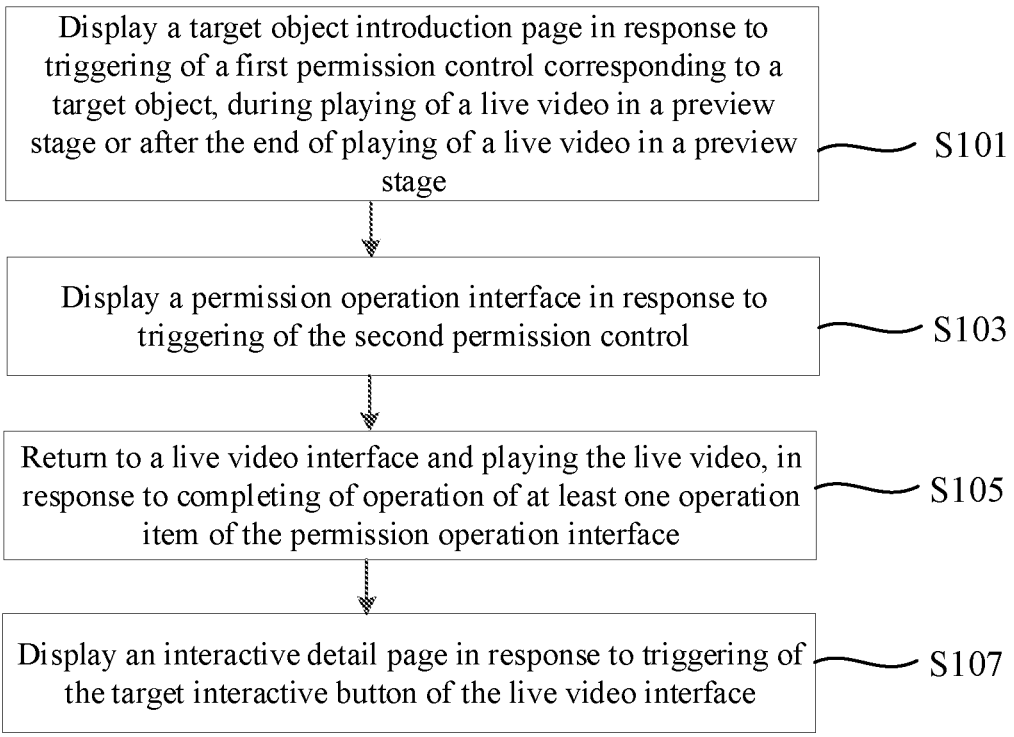
FIG. 16 is a flowchart of yet another livestreaming method provided by the present disclosure.

FIG. 16 is a flowchart of yet another livestreaming method provided by the present disclosure. FIG. 16 is on the basis of the embodiment shown in FIG. 3, and after S105 is performed, further comprises:

S107: displaying an interactive detail page in response to triggering of the target interactive button of the live video interface.

The interactive detail page displays virtual props corresponding to interactive data.

Figure 17:
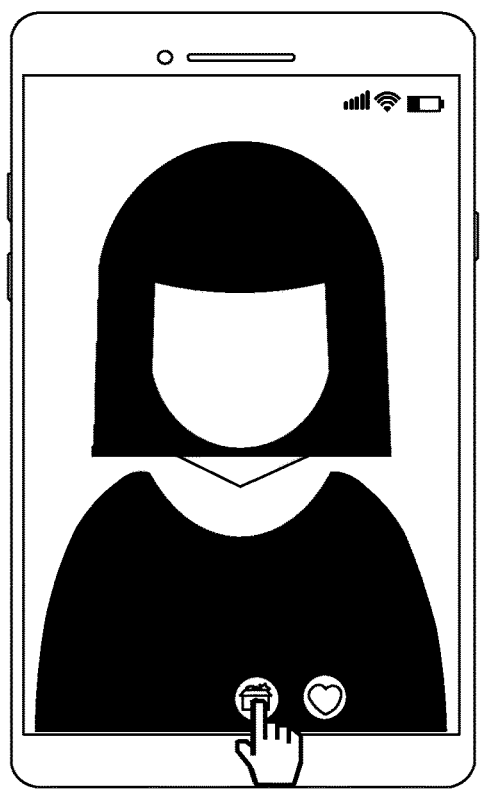
FIG. 17 is a diagram of yet another live video interface provided by the present disclosure.
Figure 18:
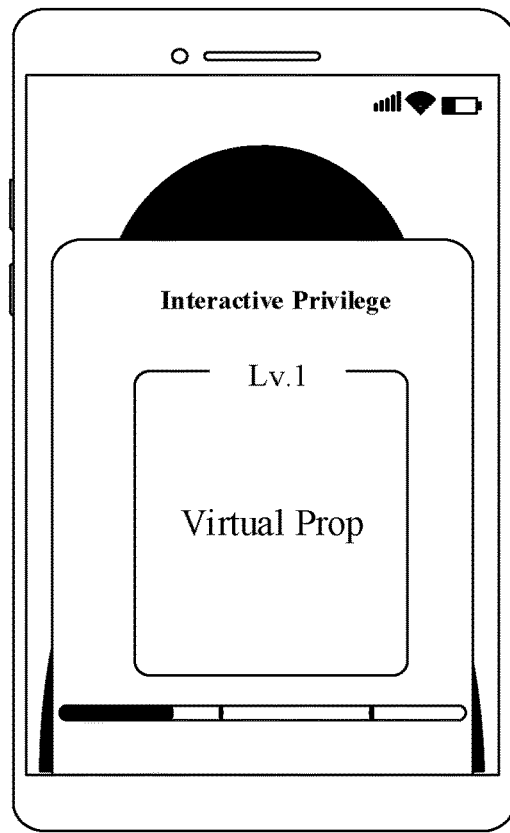
FIG. 18 is a diagram of yet another live video interface provided by the present disclosure.

Exemplarily, FIG. 17 is a diagram of yet another live video interface provided by the present disclosure, and FIG. 18 is a diagram of yet another live video interface provided by the present disclosure. After acquiring the viewing permission, the user returns to the live video interface as illustrated in FIG. 17, in which at least one interactive button is displayed, and the user may trigger the target interactive button as illustrated in FIG. 17. In response to the triggering of the target interactive button, the interactive detail page as illustrated in FIG. 18 is displayed, in which the current interactive data of the permitted user is displayed, such as a progress bar as illustrated in FIG. 18. Virtual props corresponding to the current interactive data of the permitted user may be further displayed, so that the user may interact by triggering the virtual props.

In this embodiment, by displaying an interactive detail page in response to triggering of the target interactive button of the live video interface, the virtual props corresponding to the interactive data are displayed on the interactive detail page, so that the user may interact by the virtual props, which improves the interactive interest.

Figure 19:
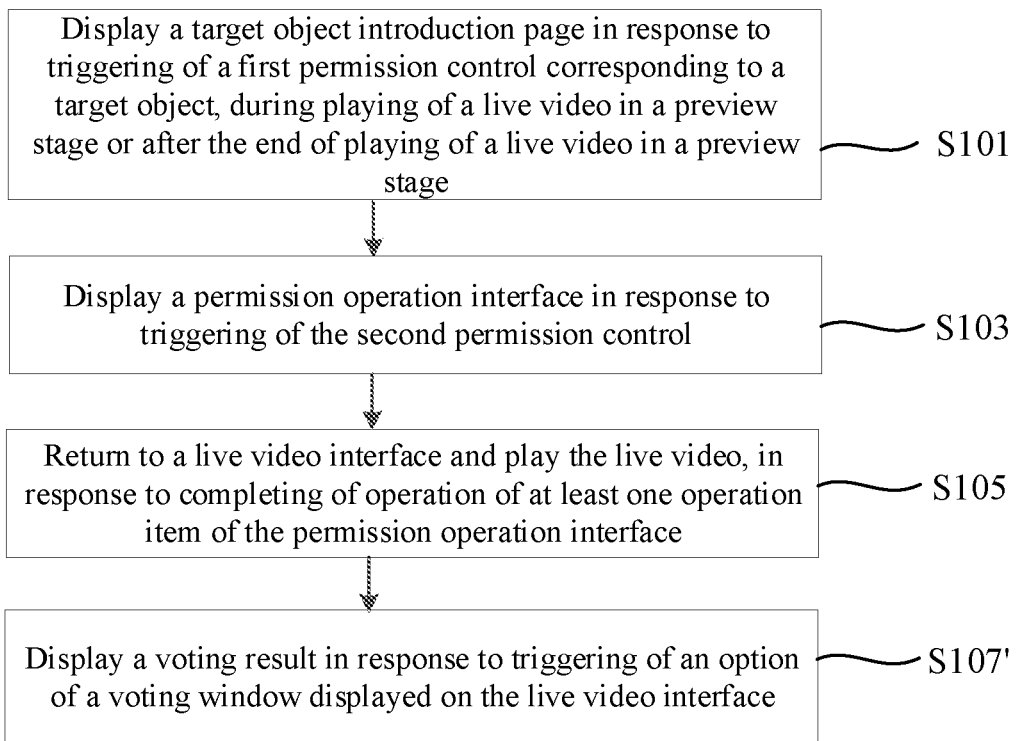
FIG. 19 is a flowchart of yet another livestreaming method provided by the present disclosure.

FIG. 19 is a flowchart of yet another livestreaming method provided by the present disclosure. FIG. 19 is on the basis of the embodiment shown in FIG. 3, and after S105 is performed, the method further includes:

S107': displaying a voting result in response to triggering of an option of a voting window displayed on the live video interface.

Figure 20:
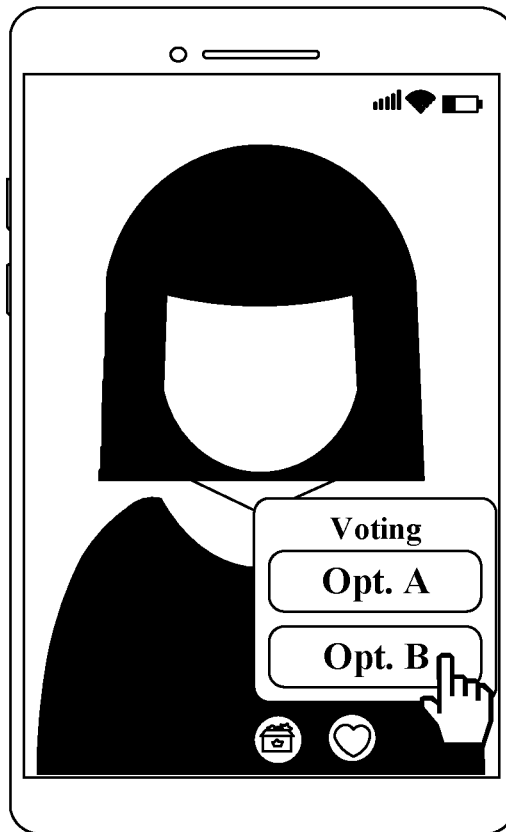
FIG. 20 is a diagram of yet another live video interface provided by the present disclosure.

Exemplarily, FIG. 20 is a diagram of yet another live video interface provided by the present disclosure, and FIG. 21 is a diagram of yet another live video interface provided by the present disclosure. After the user acquires the viewing permission, and during the watching of the live video, the anchor will carry out some voting interaction sessions in order to enhance the interaction with the user. After the anchor triggers a voting interaction, the live video interface watched by the user displays a voting window as illustrated in FIG. 20, and the voting window displays questions corresponding to this vote and options to respond. The user may trigger a corresponding option according to own actual situation, as illustrated in FIG. 20. In response to the triggering of the options in the voting window displayed on the live video interface, a voting result is displayed. The voting result may exhibit users' choices and a statistical result of current voting, as illustrated in FIG. 21.

In this embodiment, an interaction with the anchor may be implemented by the user's triggering of an option of a voting window displayed on the live video interface. An interaction with other users may be implemented by displaying a voting result in response to the triggering of the option of the voting window displayed on the live video interface. As such, the interaction form is increased, and the interactive interest is improved.

FIG. 22 is a flowchart of yet another livestreaming method provided by the present disclosure. FIG. 22 is on the basis of the embodiment shown in FIG. 3, and after S105 is performed, the method further includes:

S107": displaying the live video interface in landscape and full screen in response to triggering of the full-screen control.

Figure 23:
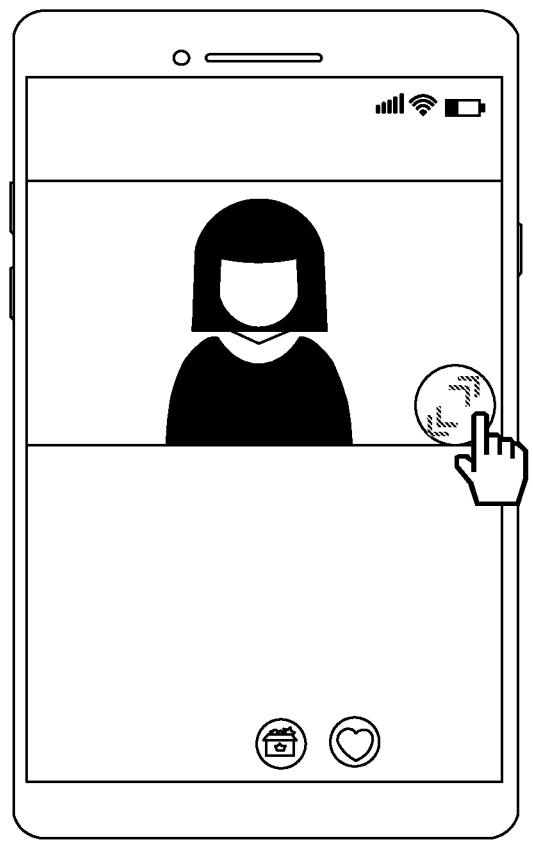
FIG. 23 is a diagram of yet another live video interface provided by the present disclosure.

Exemplarily, FIG. 23 is a diagram of yet another live video interface provided by the present disclosure. The live video stream includes a landscape video stream as illustrated in FIG. 23 and a portrait video stream as illustrated in FIG. 17. Whether the pushed live video stream is a landscape video stream or a portrait video stream is based on the anchor's needs.

Figure 24:
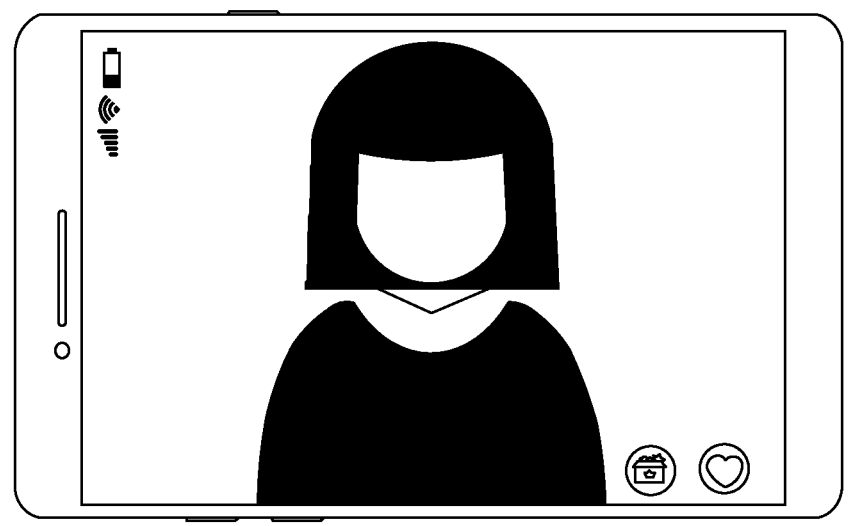
FIG. 24 is a diagram of yet another live video interface provided by the present disclosure.

After the user acquires the viewing permission, and when the live video stream is a landscape video stream, the live video interface further displays a full-screen control as illustrated in FIG. 23. By triggering the full-screen control as illustrated in FIG. 23, the live video interface may be displayed in landscape and full screen, as illustrated in FIG. 24.

In this embodiment, after the user acquires the viewing permission, by triggering the full-screen control displayed in the live video interface when the live video stream is a landscape video stream, the live video interface may be displayed in landscape and full screen, so that the permitted user can immersively experience the live video, and the experience of the permitted user can be improved.

In other scenarios, the anchor may provide an explanation of the viewing permission of the future live videos in the livestreaming room and the user can get the viewing permission of the future live videos in other livestreaming rooms by watching the anchor's current live video. For example, the anchor may explain a live concert to be given two days later, and pre-sell tickets for this concert. The user can get the tickets for this concert through the permission control on the anchor's current live video interface.

Figure 25:
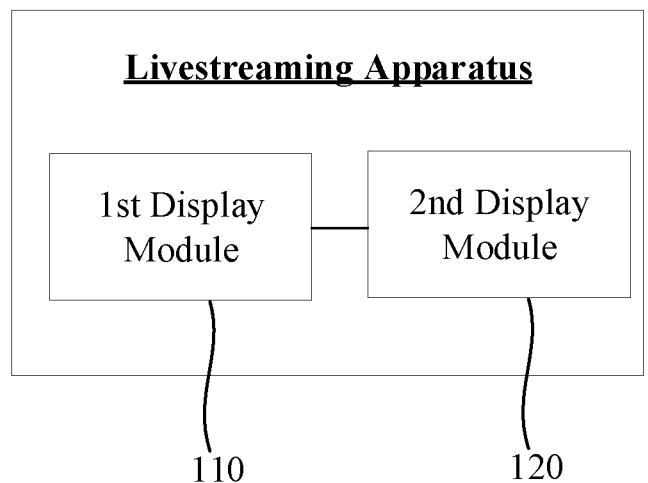
FIG. 25 is a structural diagram of a livestreaming apparatus provided by the present disclosure.

The present disclosure further provides a livestreaming apparatus. FIG. 25 is a structural diagram of a livestreaming device provided by the present disclosure, as illustrated in FIG. 25. The livestreaming apparatus includes the first display module 110 and the second display module 120.

The first display module 110 is configured to: display a target object introduction page in response to triggering of the first permission control corresponding to a target object, during playing of a live video in a preview stage or after the end of playing of a live video in a preview stage; and display a permission operation interface in response to triggering of the second permission control. The permission operation interface includes at least one operation item. The target object introduction page includes the second permission control. A live video stream is blurred or stopped from being pushed after the end of playing of the live video in the preview stage.

The second display module 120 is configured to return to a live video interface and play the live video, in response to completing of operation of at least one operation item of the permission operation interface.

In a possible implementation, the first display module 110 is further configured to display the target object introduction page in response to triggering of the first permission control corresponding to the target object displayed on the live video interface during playing of the live video in the preview stage in a virtual livestreaming room.

Alternatively, the first display module 110 is further configured to: display an interactive introduction page in response to triggering of a target interactive button on the live video interface during playing of the live video in the preview stage in a virtual livestreaming room, and display the target object introduction page in response to triggering of the first permission control displayed on the interactive introduction page.

Alternatively, the first display module 110 is further configured to: blur the live video stream or stop pushing the live video stream, and display the first permission control corresponding to the target object on the live video interface, after the end of playing of the live video in the preview stage in a virtual livestreaming room, and display the target object introduction page in response to triggering of the first permission control.

In a possible implementation, the first display module 110 is further configured to: blur the live video stream or stop pushing the live video stream, and pop up a target object conversion card on the live video interface, after the end of playing of the live video in the preview stage in a preview stream, and display the target object introduction page in response to triggering of the first permission control displayed on the target object conversion card; or, display the target object introduction page in response to triggering of any position of the target object conversion card.

In a possible implementation, before the returning to a live video interface and playing the live video, in response to completing of operation of at least one operation item of the permission operation interface, part or all of the interactive buttons displayed on the live video interface are in a trigger-forbidden state.

In a possible implementation, during playing of the live video in the preview stage in a preview stream, the live video interface displays a permission tag corresponding to the target object. The permission tag is used to indicate that permission operation is required to watch the complete live video.

In a possible implementation, the second display module 120 is further configured to display an interactive detail page on which virtual props corresponding to interactive data are displayed, in response to triggering of the target interactive button of the live video interface.

In a possible implementation, the second display module 120 is further configured to display a voting result in response to triggering of an option of a voting window displayed on the live video interface.

In a possible implementation, when the live video stream is a landscape video stream, the live video interface further displays a full-screen control.

The second display module 120 is further configured to display the live video interface in landscape and full screen in response to triggering of the full-screen control.

The steps usable for performing the above method embodiment corresponding to the apparatus of this embodiment have similar implementation principle and technical effects, which will not be repeated here.

The present disclosure further provides an electronic device comprising a processor for executing a computer program stored in a memory. The computer program, when executed by the processor, implements the steps of the above method embodiments.

The present disclosure further provides a computer-readable storage medium having stored thereon a computer program which, when executed by a processor, implements the steps of the above method embodiments.

The present disclosure further provides a computer program product, which, when executed on a computer, causes the computer to perform the steps of implementing the above method embodiment.

It should be noted that, herein, relational terms such as "first", "second" etc., are merely used to distinguish one entity or operation from another, and do not necessarily require or imply that there is any such actual relationship or order between these entities or operations. Moreover, the terms "include", "comprise" or any other variation thereof are intended to encompass non-exclusive inclusion, so that a process, method, article or device including a series of elements includes not only those elements, but also other elements not explicitly listed or elements inherent to such process, method, article or device. Without further limitations, an element defined by the phrase "including a/an . . . " does not exclude the existence of additional identical elements in the process, method, article or device including the said element.

What has been described above is only the specific implementations of the present disclosure, so that those skilled in the art can understand or implement the present disclosure. Many modifications to these embodiments will be obvious to those skilled in the art, and the general principles defined herein can be implemented in other embodiments without departing from the spirit or scope of the present disclosure. Therefore, the present disclosure will not be limited to the embodiments described herein, but is to conform to the widest scope consistent with the principles and novel features disclosed herein.

The invention claimed is:

1. A livestreaming method, comprising:
displaying a target object introduction page in response to triggering of a first permission control corresponding to a target object, during playing of a live video in a preview stage or after an end of the playing of the live video in the preview stage, wherein the target object introduction page comprises a second permission control, and a live video stream is blurred or stopped from being pushed after the end of the playing of the live video in the preview stage;
displaying a permission operation interface in response to triggering of the second permission control, wherein the permission operation interface comprises at least one operation item; and
returning to a live video interface and playing the live video, in response to completing of an operation of the at least one operation item of the permission operation interface,
wherein the at least one operation item comprises an operation item for confirming acquisition of viewing permission and an operation item for giving up the acquisition of viewing permission, the operation item for confirming the acquisition of viewing permission indicates an operation item for confirming acquisition of viewing permission of the live video, and the operation item for giving up the acquisition of viewing permission indicates an operation item for giving up the acquisition of viewing permission of the live video.

2. The livestreaming method according to claim 1, wherein the displaying a target object introduction page in response to triggering of a first permission control corresponding to a target object, during playing of a live video in a preview stage or after an end of the playing of the live video in the preview stage comprises:
displaying the target object introduction page in response to triggering of the first permission control corresponding to the target object displayed on the live video interface during playing of the live video in the preview stage in a virtual livestreaming room; or,
displaying an interactive introduction page in response to triggering of a target interactive button on the live video interface during playing of the live video in the preview stage in a virtual livestreaming room, and displaying the target object introduction page in response to triggering of the first permission control displayed on the interactive introduction page; or,
blurring the live video stream or stopping pushing the live video stream, and displaying the first permission control corresponding to the target object on the live video interface, after the end of playing of the live video in the preview stage in a virtual livestreaming room, and displaying the target object introduction page in response to triggering of the first permission control.

3. The livestreaming method according to claim 1, wherein the displaying a target object introduction page in response to triggering of a first permission control corresponding to a target object, after an end of playing of a live video in a preview stage comprises:
blurring the live video stream or stopping pushing the live video stream, and popping up a target object conversion card on the live video interface, after the end of playing of the live video in the preview stage in a preview stream, and displaying the target object introduction page in response to triggering of the first permission control displayed on the target object conversion card; or, displaying the target object introduction page in response to triggering of any position of the target object conversion card.

4. The livestreaming method according to claim 1, wherein before the returning to a live video interface and playing the live video, in response to completing of an operation of the at least one operation item of the permission operation interface, part or all of interactive buttons displayed on the live video interface are in a trigger-forbidden state.

5. The livestreaming method according to claim 3, wherein during playing of the live video in the preview stage in a preview stream, the live video interface displays a permission tag corresponding to the target object, wherein the permission tag is used to indicate that a permission operation is required to watch a complete live video.

6. The livestreaming method according to claim 1, wherein, after the returning to a live video interface and playing the live video, in response to completing of an operation of the at least one operation item of the permission operation interface, the method further comprises:
displaying an interactive detail page in response to triggering of a target interactive button of the live video interface, wherein the interactive detail page displays virtual props corresponding to interactive data.

7. The livestreaming method according to claim 1, wherein, after the returning to a live video interface and playing the live video, in response to completing of an operation of the at least one operation item of the permission operation interface, the method further comprises:
displaying a voting result in response to triggering of an option of a voting window displayed on the live video interface.

8. The livestreaming method according to claim 1, wherein, in a case where the live video stream is a landscape video stream, the live video interface further displays a full-screen control; and
the method further comprises:
displaying the live video interface in landscape and full screen in response to triggering of the full-screen control.

9. A livestreaming apparatus, comprising:
a first display module, configured to: display a target object introduction page in response to triggering of a first permission control corresponding to a target object, during playing of a live video in a preview stage or after an end of the playing of the live video in the preview stage, wherein the target object introduction page comprises a second permission control, and a live video stream is blurred or stopped from being pushed after the end of the playing of the live video in the preview stage; and display a permission operation interface in response to triggering of the second permission control, wherein the permission operation interface includes at least one operation item; and
a second display module, configure to return to a live video interface and play the live video, in response to completing of an operation of the at least one operation item of the permission operation interface;
wherein the at least one operation item comprises an operation item for confirming acquisition of viewing permission and an operation item for giving up the acquisition of viewing permission, the operation item for confirming the acquisition of viewing permission indicates an operation item for confirming acquisition of viewing permission of the live video, and the operation item for giving up the acquisition of viewing permission indicates an operation item for giving up the acquisition of viewing permission of the live video.

10. An electronic device comprising a processor for executing a computer program stored in a memory, wherein the computer program, when executed by the processor, implements a livestreaming method, and the livestreaming method comprises:
displaying a target object introduction page in response to triggering of a first permission control corresponding to a target object, during playing of a live video in a preview stage or after an end of the playing of the live video in the preview stage, wherein the target object introduction page comprises a second permission control, and a live video stream is blurred or stopped from being pushed after the end of the playing of the live video in the preview stage;
displaying a permission operation interface in response to triggering of the second permission control, wherein the permission operation interface comprises at least one operation item;
returning to a live video interface and playing the live video, in response to completing of an operation of the at least one operation item of the permission operation interface,
wherein the at least one operation item comprises an operation item for confirming acquisition of viewing permission and an operation item for giving up the acquisition of viewing permission, the operation item for confirming the acquisition of viewing permission indicates an operation item for confirming acquisition of viewing permission of the live video, and the operation item for giving up the acquisition of viewing permission indicates an operation item for giving up the acquisition of viewing permission of the live video.

11. A non-transitory computer-readable storage medium having stored thereon a computer program which, when executed by a processor, implements the steps of the method according to claim 1.

12. The livestreaming apparatus of claim 9, the first display module is further configured to: display the target object introduction page in response to triggering of the first permission control corresponding to the target object displayed on the live video interface during playing of the live video in the preview stage in a virtual livestreaming room; or
display an interactive introduction page in response to triggering of a target interactive button on the live video interface during playing of the live video in the preview stage in a virtual livestreaming room, and display the target object introduction page in response to triggering of the first permission control displayed on the interactive introduction page.

13. The livestreaming apparatus of claim 9, the first display module is further configured to: blur the live video stream or stop pushing the live video stream, and display the first permission control corresponding to the target object on the live video interface, after the end of playing of the live video in the preview stage in a virtual livestreaming room, and display the target object introduction page in response to triggering of the first permission control.

14. The livestreaming apparatus of claim 9, the first display module is further configured to: blur the live video stream or stop pushing the live video stream, and pop up a target object conversion card on the live video interface, after the end of playing of the live video in the preview stage in a preview stream, and display the target object introduction page in response to triggering of the first permission control displayed on the target object conversion card; or, display the target object introduction page in response to triggering of any position of the target object conversion card.

15. The livestreaming apparatus of claim 9, wherein before the returning to a live video interface and playing the live video, in response to completing of an operation of the at least one operation item of the permission operation interface, part or all of interactive buttons displayed on the live video interface are in a trigger-forbidden state.

16. The livestreaming apparatus of claim 9, wherein during playing of the live video in the preview stage in a preview stream, the live video interface displays a permission tag corresponding to the target object, wherein the permission tag is used to indicate that a permission operation is required to watch a complete live video.

17. The livestreaming apparatus of claim 9, wherein, after the returning to a live video interface and playing the live video, in response to completing of an operation of the at least one operation item of the permission operation interface, the second display module is further configured to:

display an interactive detail page in response to triggering of a target interactive button of the live video interface, wherein the interactive detail page displays virtual props corresponding to interactive data.

18. The livestreaming apparatus of claim 9, wherein, after the returning to a live video interface and playing the live video, in response to completing of an operation of the at least one operation item of the permission operation interface, the second display module is further configured to:

display a voting result in response to triggering of an option of a voting window displayed on the live video interface.

19. The livestreaming apparatus of claim 9, wherein, in a case where the live video stream is a landscape video stream, the live video interface further displays a full-screen control; and the second display module is further configured to:

display the live video interface in landscape and full screen in response to triggering of the full-screen control.

* * * * *